US011876330B2

(12) United States Patent
Bluemmel

(10) Patent No.: US 11,876,330 B2
(45) Date of Patent: Jan. 16, 2024

(54) TOOL FOR PRODUCING AN ARRANGEMENT COMPOSED OF AN ELECTRICAL LINE AND CONTACT DEVICE

(71) Applicant: TE Connectivity Germany GmbH, Bensheim (DE)

(72) Inventor: Uwe Bluemmel, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 89 days.

(21) Appl. No.: 17/720,870

(22) Filed: Apr. 14, 2022

(65) Prior Publication Data

US 2022/0336969 A1 Oct. 20, 2022

(30) Foreign Application Priority Data

Apr. 14, 2021 (DE) ......................... 102021109290.6

(51) Int. Cl.
*H01R 4/20* (2006.01)
*H01R 43/058* (2006.01)

(52) U.S. Cl.
CPC ............. *H01R 4/20* (2013.01); *H01R 43/058* (2013.01)

(58) Field of Classification Search
CPC ........ H01R 4/20; H01R 43/058; H01R 43/18; H01R 43/048; H01R 43/0425; H01R 43/042; H01R 43/04
(Continued)

(56) References Cited

U.S. PATENT DOCUMENTS 1,955,695 A * 4/1934 Veling .................. H01R 43/042 439/878
3,241,098 A 3/1966 Cobaugh et al.
(Continued)

FOREIGN PATENT DOCUMENTS

DE 19848343 A1 4/1999
DE 69701099 T2 9/2000
(Continued)

OTHER PUBLICATIONS

Office Action from Japanese Patent Office, dated Apr. 11, 2023 with English translation thereof, corresponding to Application No. 2022-064963, 7 pages.
(Continued)

*Primary Examiner* — Harshad C Patel
(74) *Attorney, Agent, or Firm* — Barley Snyder

(57) ABSTRACT

A tool for producing an arrangement composed of an electrical line and a contact device with a crimp sleeve includes a first press jaw unit and a guide unit. The first press jaw unit delimits a tool receptacle and receives the crimp sleeve and the electrical line. The first press jaw unit has a first press jaw with a first press surface and a second press jaw with a second press surface. The second press surface is adjustable between a first press position positioned radially inwardly and a second press position. The guide unit provides a first pressing force transmitted into the first press surface and from the first press jaw to the second press jaw. The first press surface stamps a first stamped indentation and the second press surface stamps a second stamped indentation into the crimp sleeve to crimp the crimp sleeve on the electrical line.

19 Claims, 6 Drawing Sheets

(58) Field of Classification Search
USPC ........... 439/866, 578–595, 878; 29/861–863, 29/842, 848, 888.06, 898.054, 282, 283, 29/5, 280
See application file for complete search history.

(56) References Cited

U.S. PATENT DOCUMENTS

| | | | | |
|---|---|---|---|---|
| 6,019,615 | A | 2/2000 | Masuda | |
| 6,656,002 | B2 * | 12/2003 | Zhao | H01R 13/187 439/787 |
| 8,969,725 | B2 | 3/2015 | Mayer | |
| 9,570,870 | B2 * | 2/2017 | Kawamura | H01R 4/187 |
| 10,483,657 | B2 * | 11/2019 | Nabeta | H01R 4/187 |
| 10,797,457 | B2 * | 10/2020 | Sato | B23K 20/10 |
| 10,826,261 | B2 * | 11/2020 | Sato | H01R 43/28 |
| 10,886,684 | B2 * | 1/2021 | Sato | H01R 4/185 |
| 2011/0094797 | A1 * | 4/2011 | Otsuka | H01R 43/0207 29/857 |
| 2013/0252489 | A1 * | 9/2013 | Kumakura | H01R 4/18 29/863 |
| 2014/0224535 | A1 * | 8/2014 | Otsuka | H01R 13/03 29/863 |
| 2021/0226355 | A1 | 7/2021 | Haspel et al. | |

FOREIGN PATENT DOCUMENTS

| | | | |
|---|---|---|---|
| DE | 102012002218 | A1 | 11/2012 |
| DE | 202018105955 | U1 | 12/2018 |
| DE | 102020101236 | A1 | 7/2021 |
| JP | H167294 | U | 1/1991 |
| WO | 9748154 | | 12/1997 |

OTHER PUBLICATIONS

Office Action from the German Patent and Trade Mark Office dated Nov. 29, 2022, corresponding to Application No. 10 2021 109 290.6, 7 pages.

* cited by examiner

TOOL FOR PRODUCING AN ARRANGEMENT COMPOSED OF AN ELECTRICAL LINE AND CONTACT DEVICE

CROSS-REFERENCE TO RELATED APPLICATIONS

This application claims the benefit of the filing date under 35 U.S.C. § 119(a)-(d) of German Patent Application No. 102021109290.6, filed on Apr. 14, 2021.

FIELD OF THE INVENTION

The present invention relates to an arrangement including an electrical line and a contact device, and to a tool used for producing the arrangement.

BACKGROUND

German patent application DE 10 2020 101 236.5 discloses an arrangement having a contact device, an electrical cable, and a sheath. The contact device has a crimp sleeve and a contact element, wherein the crimp sleeve connects a shielding conductor of the electrical cable to the contact element.

SUMMARY

A tool for producing an arrangement composed of an electrical line and a contact device with a crimp sleeve includes a first press jaw unit and a guide unit. The first press jaw unit delimits a tool receptacle and receives the crimp sleeve and the electrical line. The first press jaw unit has a first press jaw with a first press surface and a second press jaw with a second press surface. The second press surface is adjustable between a first press position positioned radially inwardly and a second press position. The guide unit provides a first pressing force transmitted into the first press surface and from the first press jaw to the second press jaw. The first press surface stamps a first stamped indentation and the second press surface stamps a second stamped indentation into the crimp sleeve to crimp the crimp sleeve on the electrical line.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
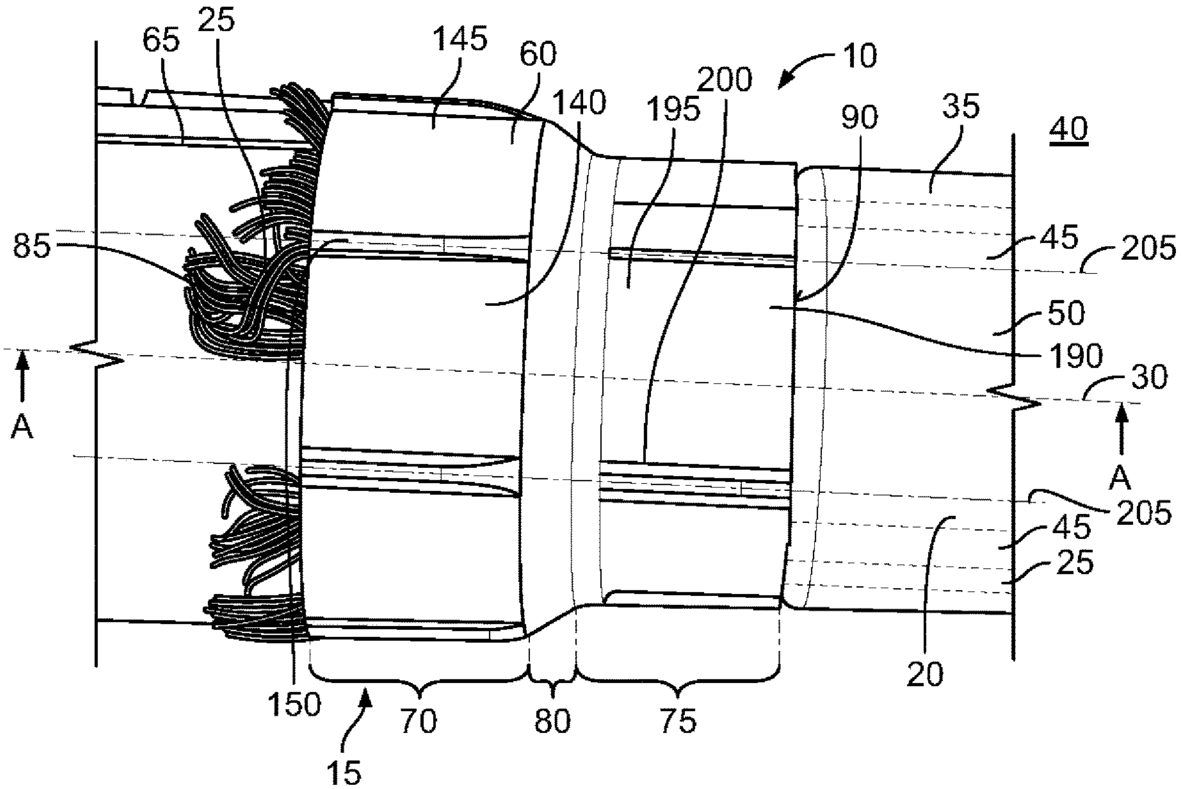
FIG. 1 is a side view of an arrangement according to an embodiment.

The invention shall be explained in more detail hereafter by way of example with reference to embodiments shown in the drawings. The developments and configurations shown there are each independent of one another and can be combined with one another depending on the application.

FIG. 1 shows a side view of an arrangement 10 according to an embodiment. The arrangement 10 has a contact device 15 and an electrical line 20. The electrical line 20 is configured, for example, as a shielded cable, in particular as a shielded high-voltage cable for transmitting electrical power in a motor vehicle, in particular for transmitting electrical charging power or drive power in a motor vehicle. The electrical line 20 has a first electrical conductor 25. The first electrical conductor 25 may be configured as a shield and/or outer conductor. The first electrical conductor 25 extends along an axis 30. Here, the first electrical conductor 25 is of approximately hollow cylindrical form with respect to the axis 30. The first electrical conductor 25 may, for example, have a wire mesh, which is for example formed with fine or ultrafine wire. The wire mesh may be woven or have individual wires that run parallel to the axis 30.

Below, for ease of understanding, the arrangement 10 will be described on the basis of a cylindrical coordinate system with respect to the axis 30.

The first electrical conductor 25 is encased radially at the outside by a sheath 35. The sheath 35 has an electrically insulating first material and electrically insulates the first electrical conductor 25 with respect to the surroundings 40. In an embodiment, the sheath 35 circumferentially fully encloses the first electrical conductor 25. In FIG. 1, the sheath 35 has, for example, an externally substantially cylindrical form. Here, the sheath 35 runs in a circumferential direction about the axis 30.

Radially at the inside with respect to the first electrical conductor 25, the electrical line 20 has, for example, an electrically insulating intermediate layer 45. In the embodiment, the electrically insulating intermediate layer 45 is circumferentially encompassed by the first electrical conductor 25.

Radially at the inside with respect to the intermediate layer 45, the electrical line 20 has, for example, a second electrical conductor 50, as shown in FIG. 1. The second electrical conductor 50 may be formed from a single wire. The second electrical conductor 50 may also be formed from a bundle of wires, which are, for example, in the form of fine or ultrafine wire. The second electrical conductor 50 may also be referred to as an inner conductor. The second electrical conductor 50 may, for example, be used for transmitting a data signal. Here, an electrical current that is to be transmitted is less than 1 ampere.

As shown in FIG. 1 by the geometrical configuration of the second electrical conductor 50, the second electrical conductor 50 may also be configured for transmitting electrical power, for example for the supply of power to an electric motor. The electric motor may, for example, be a drive or a traction motor of a motor vehicle. Charging power may also be transmitted via the arrangement 10 and the second electrical conductor 50. In an embodiment, for this purpose, the second electrical conductor 50 has at least a cross-sectional area of at least 2 $mm^2$, 5 $mm^2$, 10 $mm^2$, or 25 $mm^2$. The second electrical conductor 50 may for example be configured such that the cross-sectional area of the second electrical conductor 50 is less than or equal to 200 $mm^2$, less than or equal to 100 $mm^2$, or less than or equal to 50 $mm^2$.

The second electrical conductor 50 has an electrically conductive second material, in an embodiment copper and/or aluminum and/or gold and/or silver. The first material and/or the second material may be identical or different. The first material may for example also have copper and/or aluminum and/or gold and/or silver.

The intermediate layer 45 may be configured so as to run in hollow cylindrical form about the axis 30 and is arranged radially between the first electrical conductor 25 and the second electrical conductor 50. The intermediate layer 45 insulates the second electrical conductor 50 with respect to the first electrical conductor 25. In the embodiment, the first electrical conductor 25 is configured to electromagnetically shield the second electrical conductor 50 with respect to the surroundings 40. In particular, by the first electrical conductor 25, it is sought to prevent a high electrical current, for example 100 amperes, that is transmitted by the second electrical conductor 50 from generating an electromagnetic field that interferes with further electrical appliances in the surroundings 40 of the electrical line 20. An electromagnetic compatibility of the arrangement 10 is thus improved by the first electrical conductor 25.

The contact device 15 has a crimp sleeve 60 and a contact element 65 that is connected to the crimp sleeve 60. The contact element 65 may, for example, be configured so as to run in hollow cylindrical form about the axis 30 at least in certain regions. The contact element 65 extends along the axis 30. The contact element 65 is of electrically conductive form and serves to form an electrical contact with respect to a further contact device (not visible in FIG. 1).

The crimp sleeve 60 has a third material, wherein the third material is electrically conductive and mechanically easily deformable. In an embodiment, the contact element 65 likewise has the third material.

The crimp sleeve 60 has a first sub-portion 70, a second sub-portion 75 and a transition portion 80 that is arranged axially between the first sub-portion 70 and the second sub-portion 75.

In an axial direction, the first sub-portion 70 adjoins a first end side 85 that is arranged on a side facing towards the contact element 65. The first sub-portion 70 has a first radial extent. On the side that is axially averted from the first end side 85, the first sub-portion 70 is directly adjoined by the transition portion 80. The transition portion 80 is of substantially conical form about the axis 30 and mechanically and electrically connects the first sub-portion 70 to the second sub-portion 75. The second sub-portion 75 is arranged so as to axially adjoin the transition portion 80 on a side that is averted from the first end side 85. The second sub-portion 75 has a second radial extent, wherein the second radial extent is slimmer than the first radial extent of the first sub-portion 70. The second sub-portion 75 ends at a second end side 90 that is situated axially opposite the first end side 85.

The first end side 85 and the second end side 90 are configured to run substantially perpendicular to the axis 30 and have substantially a ring-shaped basic shape in a side view. Here, owing to the smaller radial extent of the second sub-portion 75, the second end side 90 has a smaller radial extent than the first end side 85.

In the state in which the contact device 15 has been installed on the electrical cable 20, the crimp sleeve 60 has at least one first stamped indentation 140 in the first sub-portion 70. Furthermore, in the second sub-portion 75, the crimp sleeve 60 has a second stamped indentation 190, which extends circumferentially substantially over an identical angular segment in relation to the first stamped indentation 140.

Figure 2:
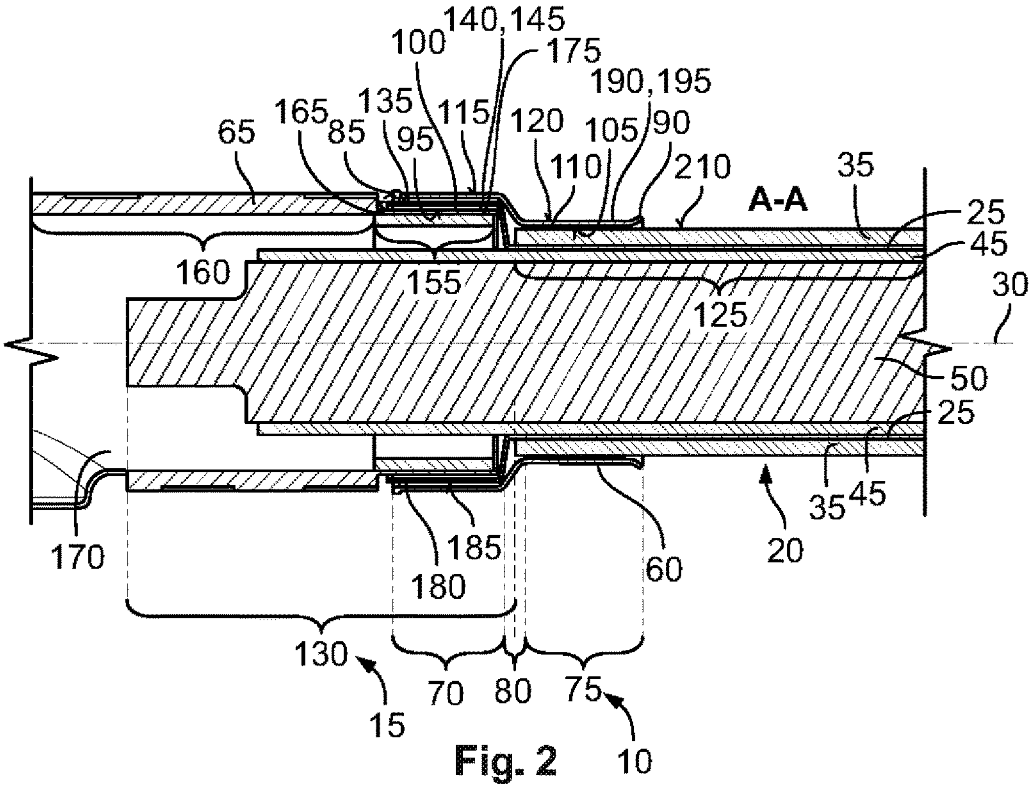
FIG. 2 is a sectional side view of the arrangement, taken along plane A-A of FIG. 1.

By way of a first inner circumferential side 95 in the first sub-portion 70, the crimp sleeve 60 delimits a first crimp receptacle 100, as shown in FIG. 2. Furthermore, by way of a second inner circumferential side 105 of the crimp sleeve 60 in the second sub-portion 75, the crimp sleeve 60 delimits a second crimp receptacle 110. The second crimp receptacle 110 is arranged so as to be axially offset with respect to the first crimp receptacle 100 in relation to the axis 30. In the embodiment, both the first inner circumferential side 95 and the second inner circumferential side 105 are configured without gaps. This means that, in the embodiment, over the entire extent along the axis 30, the crimp sleeve 60 has no slot or gap that extends radially outward from the inner circumferential side 95, 105 to an outer circumferential side 115, 120 of the respective sub-portion 70, 75 of the crimp sleeve 60.

The electrical line 20 has a sheathed portion 125 and a stripped portion 130, as shown in FIG. 2. In the sheathed portion 125, the electrical line 20 is configured as described above. In the stripped portion 130, the sheath 35 has been removed from the first electrical conductor 25 radially at the outside, such that, radially at the outside, the first electrical conductor 25 is not protected by the first sheath 35. The first electrical conductor 25 has a third outer circumferential side 135, with which contact can be freely made in the stripped portion 130.

Furthermore, as shown in FIG. 1, the crimp sleeve 60 has a third stamped indentation 145 in the first sub-portion 70. The third stamped indentation 145 is arranged so as to be offset in a circumferential direction with respect to the first stamped indentation 140. The first stamped indentation 140 and the third stamped indentation 145 have substantially an identical extent in a circumferential direction but also, by way of example, in the direction of the axis 30. Here, in FIG. 1, it is for example the case that the first stamped indentation 140 and/or the third stamped indentation 145 extends substantially over an entire extent of the first sub-portion 70 in a direction parallel to the axis 30. The first and/or third stamped indentation 140, 145 is axially directly adjoined, on the side averted from the first end side 85, by the transition portion 80. A first thickened portion 150 is arranged between the first stamped indentation 140 and the third stamped indentation 145 in a circumferential direction. The first thickened portion 150 is configured in the form of a web and projects outwards in a radial direction beyond the first stamped indentation 140 and the third stamped indentation 145. The first thickened portion 150 is configured to be considerably narrower in a circumferential direction than the first stamped indentation 140 and/or the third stamped indentation 145.

As illustrated in FIG. 1, the crimp sleeve 60 in an embodiment has multiple first and third stamped indentations 140, 145, which are stamped into the first outer circumferential side 115 of the first sub-portion 70. In an embodiment, the first stamped indentation 140 and/or the third stamped indentation 145 each extends over a first angular segment of approximately 20° to 60°, or 30° to 45°. The first thickened portion 150 is configured to be considerably narrower in a circumferential direction than the first stamped indentation 140 and/or the third stamped indentation 145. The first thickened portion 150 may extend in a circumferential direction with respect to the axis 30 over an angular segment of approximately 0.5° to 2°, or 0.7° to 1.5°.

In the embodiment, multiple first and third stamped indentations 140, 145, which are configured so as to be substantially identical to one another, are stamped into the first outer circumferential side 115 of the first sub-portion 70. Here, the first and third stamped indentations 140, 145 have in each case an identical spacing to one another in a circumferential direction.

Furthermore, in the state in which the contact device 15 has been installed on the electrical line 20, the crimp sleeve 60 has at least the second stamped indentation 190 and a fourth stamped indentation 195 in the second sub-portion 75. The second and fourth stamped indentations 190, 195 are arranged so as to be offset with respect to one another in a circumferential direction. Here, a second thickened portion 200 is arranged between the second stamped indentation 190 and the fourth stamped indentation 195 in a circumferential direction. The second thickened portion 200 is configured to be considerably narrower in a circumferential direction than the second and/or fourth stamped indentation 190, 195.

The second stamped indentation 190 and the fourth stamped indentation 195 have substantially an identical extent in a circumferential direction and in an axial direction with respect to the axis 30. Here, the second stamped indentation 190 and the fourth stamped indentation 195 extend axially all the way between the transition portion 80 and the second end side 90.

The second thickened portion 200 arranged between the third stamped indentation 190 and the fourth stamped indentation 195 is configured in the form of a web and projects in a radial direction beyond the second stamped indentation 190 and the fourth stamped indentation 195.

In an embodiment, in the second sub-portion 75, multiple second and fourth stamped indentations 190, 195 which are arranged so as to alternate in a circumferential direction are stamped into the second sub-portion 75 on the second outer circumferential side 120. In an embodiment, the second stamped indentation 190 and/or the fourth stamped indentation 195 each extends over a second angular segment of approximately 20° to 60°, or 30° to 45°.

The second thickened portion 200 may extend in a circumferential direction with respect to the axis 30 over a fourth angular segment of approximately 0.5° to 2°, or 0.7° to 1.5°. A spacing between the second and the fourth stamped indentation 190, 195 in a circumferential direction may be identical.

In an embodiment, the second stamped indentation 190 and the first stamped indentation 140 extend in each case over the same angular segment and are arranged so as to overlap in a circumferential direction. Here, an angular overlap in a circumferential direction is to be understood to mean that the first stamped indentation 140 and the second stamped indentation 190 extend over the same angular segment even in a three-dimensional arrangement of the angular segment. Thus, if the first stamped indentation 140 lies radially to the outside in relation to the second stamped indentation 190 in a common first plane that is arranged perpendicular to the axis 30, then, if the first stamped indentation 140 and the second stamped indentation 190 were projected into a second plane in which the axis 30 runs, the first stamped indentation 140 and the second stamped indentation 190 would overlap in a radially inward direction onto the second plane. In other words, the first stamped indentation 140 and the second stamped indentation 190 are, as it were, arranged coaxially with respect to the axis 30.

Analogously to the first stamped indentation 140 and the second stamped indentation 190, the third stamped indentation 145 and the fourth stamped indentation 195 are likewise arranged so as to angularly overlap one another in a circumferential direction. This arrangement has the effect that the first and second thickened portions 150, 200 run in a common third plane 205, in which the axis 30 also runs. A particularly mechanically stable crimp sleeve can thus be provided.

FIG. 2 shows a sectional view along a section plane A-A, shown in FIG. 1, through the arrangement 10 shown in FIG. 1.

The contact element 65 has a connecting portion 155 and has a contact portion 160 that axially adjoins the connecting portion 155. The contact portion 160 has, on a side facing toward the connecting portion 155, a third end side 165 which is oriented perpendicular to the axis 30 and which forms a shoulder on the contact element 65. The contact portion 160 may extend outward in a radial direction beyond the connecting portion 155 and project radially beyond the connecting portion 155.

The connecting portion 155 is, by way of example, of hollow cylindrical form about the axis 30. At the inside, the contact element 65 has an opening 170 that extends through the entire contact element 65 along the axis 30. Here, by way of example, the axis 30 is arranged in a central position in relation to the opening 170. The contact portion 160 is merely symbolically illustrated in FIG. 2 and serves for establishing the contact with the further contact device (not illustrated).

In the embodiment, the connecting portion 155 and the contact portion 160 are mechanically and electrically connected to one another. The connecting portion 155 and the contact portion 160 are, in an embodiment, in single-piece and materially integral form. Here, the contact element 65 may be configured to be rotationally symmetrical with respect to the axis 30.

Radially at the outside, the connecting portion 155 has a third outer circumferential side 175. The third outer circumferential side 175 may for example be configured to run in cylindrical fashion about the axis 30. The connecting portion 155 may for example be configured to be longer in an axial direction parallel to the axis 30 than the first sub-portion 70 of the crimp sleeve 60.

The first electrical conductor 25 is arranged radially between the third outer circumferential side 175 of the connecting portion 155 and the first inner circumferential side 95 of the first sub-portion 70. Radially to the inside in relation to the connecting portion 155, the stripped portion 130 of the electrical line 20 is led with the second electrical conductor 50 and the intermediate layer 45 through the opening 170. Here, the stripped portion 130 may extend all the way through the connecting portion 155 and project into the contact portion 160.

The crimp sleeve 60, by way of its first inner circumferential side 95 in the first sub-portion 70, forms an annular gap 180 together with the third outer circumferential side 175 of the connecting portion 155, wherein the first electrical conductor 25 is arranged in the annular gap 180. Here, the first electrical conductor 25 is expanded in relation to the sheathed portion 125 of the line 20. The first inner circumferential side 75 in the first sub-portion 70 comes to lie closely against a fourth outer circumferential side 185 of the first electrical conductor 25, and presses against the fourth outer circumferential side 185. Here, the fourth outer circumferential side 185 generates first frictional engagement with the first inner circumferential side 75.

Radially to the inside in relation to the conical transition portion 80, the first electrical conductor 25 is likewise of conical configuration and is expanded in relation to the sheathed portion 125.

By way of the second inner circumferential side 105, the second sub-portion 75 comes to lie closely against a fifth outer circumferential side 210 of the sheath 35 in the sheathed portion 125 and presses against the fifth outer circumferential side 210 of the sheath 35. Here, the second inner circumferential side 105 generates second frictional engagement with the fifth outer circumferential side 210, such that a relief of tension between the crimp sleeve 60 and the sheath 35 can be realized in this way. As a result of the fact that the second inner circumferential side 105 comes to lie closely against the sheath 35, and as a result of the second frictional engagement and the resulting relief of tension, a situation in which the first electrical conductor 25 is subjected to tensile load at the connecting portion 155 and the crimp sleeve 60 is prevented. By the first frictional engagement and second frictional engagement, a tensile force can be transmitted along the axis 30 to the contact element 65.

Figure 3:
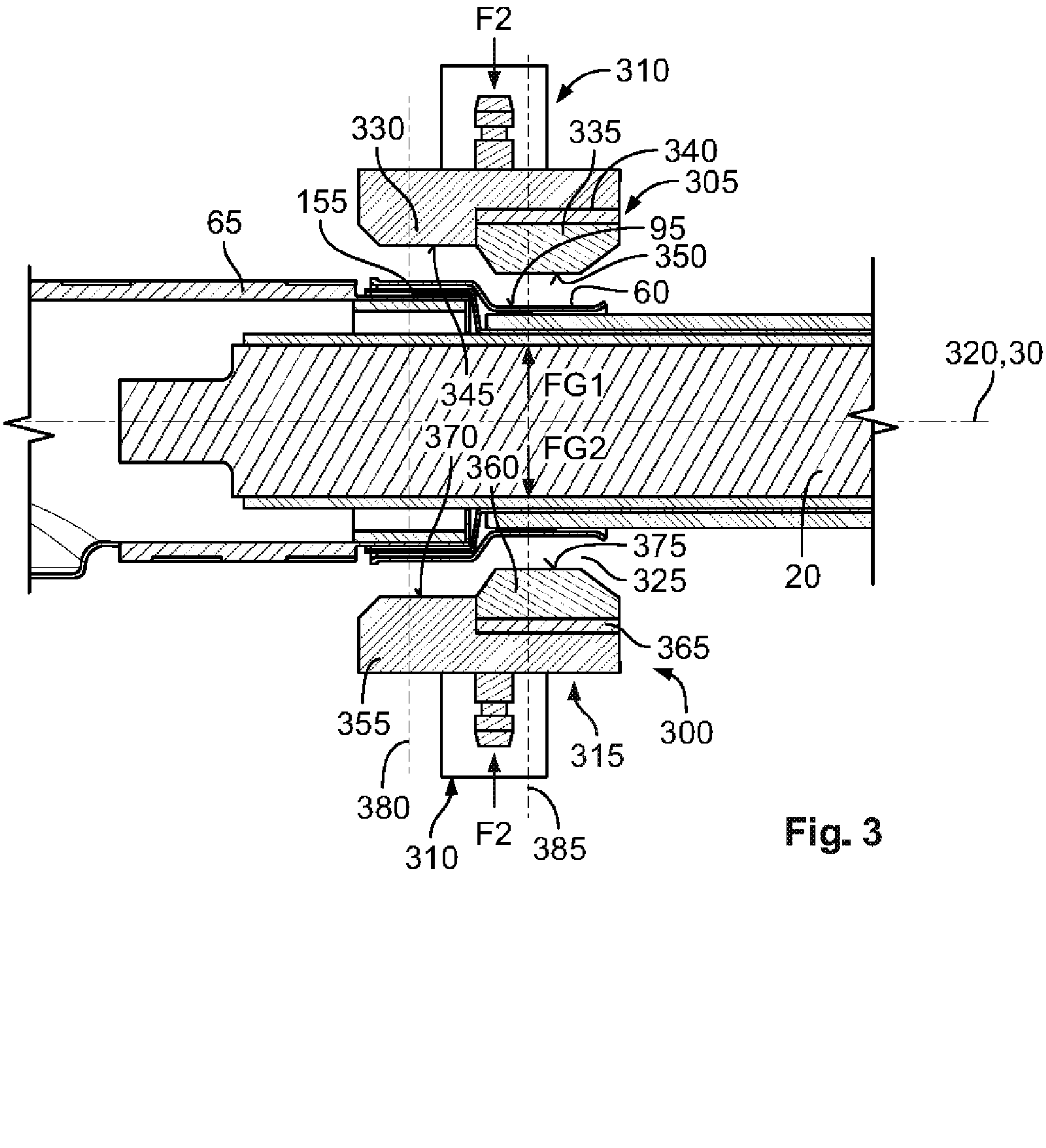
FIG. 3 is a sectional side view of the arrangement, taken along plane A-A of FIG. 1, with a tool according to an embodiment.

FIG. 3 shows a sectional view along the section plane A-A, shown in FIG. 1, through the arrangement 10 shown in FIGS. 1 and 2 and a tool 300 according to a first embodiment for producing the arrangement 10.

The tool 300 is illustrated merely schematically and in highly simplified form in FIG. 3. The tool 300 has at least one first press jaw unit 305 and one guide unit 310. The tool 300 may additionally have at least one second press jaw unit 315. The first press jaw unit 305 is arranged so as to be offset in a circumferential direction with respect to the second press jaw unit 315. In particular, it is conceivable for multiple press jaw units 305, 315 to be provided. The guide unit 310 is connected both to the first press jaw unit 305 and to the second press jaw unit 315 and is configured to move and guide the first press jaw unit 305 and the second press jaw unit 310 between a first position and a second position that is situated radially to the inside in relation to the first position.

The first press jaw unit 305 and the second press jaw unit 315 delimit, at the inside, a tool receptacle 325 that extends along a straight line 320. In FIG. 3, the straight line 320 and the axis 30 overlap. The crimp sleeve 60, the connecting portion 155 of the contact element 65 and the electrical line 20 are arranged in the tool receptacle 325.

The first press jaw unit 305 has a first press jaw 330 and a second press jaw 335 and a first setting device 340. The first press jaw 330 has a first press surface 345 on an inner side facing towards the tool receptacle 325. The second press jaw 335 has a second press surface 350 on the inner side facing towards the tool receptacle 325. The second press surface 350 is, by way of example, arranged radially to the inside in relation to the first press surface 345. Furthermore, the second press surface 350 is arranged axially offset with respect to the first press surface 345 in relation to the straight line 320.

The first setting device 340 mechanically connects the first press jaw 330 to the second press jaw 335. Here, the second press jaw 335 is adjustable in a radial direction by the first setting device 340 such that the second press surface 350 is adjustable between a first, radially inner press position relative to the first press surface 345 and a second, radially outer press position, even if the first press jaw 330 is held in the same position. The adjustment of the second press surface 350 relative to the first press surface 345 may take place independently of the actuation of the first press unit 305 by the guide unit 310, and allows an adaptation/alignment of a first radial spacing between the first press surface 345 and the second press surface 350.

The second press unit 315 is configured analogously to the first press unit 305. The second press unit 315 has a third press jaw 355, a fourth press jaw 360, and a second setting device 365. The second setting device 365 mechanically connects the fourth press jaw 360 to the third press jaw 355. The third press jaw 355 is mechanically connected, radially at the outside, to the guide unit 310. Radially to the inside in relation to the third press jaw 355, the third press jaw 355 has a third press surface 370 on an inner side facing toward the tool receptacle 325. The fourth press jaw 360 is arranged so as to be axially offset in relation to the third press surface 370.

On the radial side facing towards the tool receptacle 325, the fourth press jaw 360 has a fourth press surface 375. The fourth press surface 375 is arranged radially to the inside in relation to the third press surface 370. In the embodiment, the first press surface 345 and the third press surface 370 are, by way of example, arranged in a common fourth plane 380 with respect to the straight line 320 and so as to run on a common first circular path about the straight line 320. Likewise, the second press surface 350 and the fourth press surface 375 are arranged in a common fifth plane 385 that is axially offset with respect to the fourth plane 380. The second and fourth press surfaces 350, 375 are configured so as to run on a common second circular path about the straight line 320.

The second setting device 365 is arranged radially between the third press jaw 355 and the fourth press jaw 360. The second setting device 365 mechanically connects the third press jaw 355 to the fourth press jaw 360. By the second setting device 365, the fourth press surface 375 is adjustable, independently of the guide device 310, relative to the third press surface 370 between a third, radially inner press position and a fourth, radially outer press position that differs from the third press position.

Figure 4:
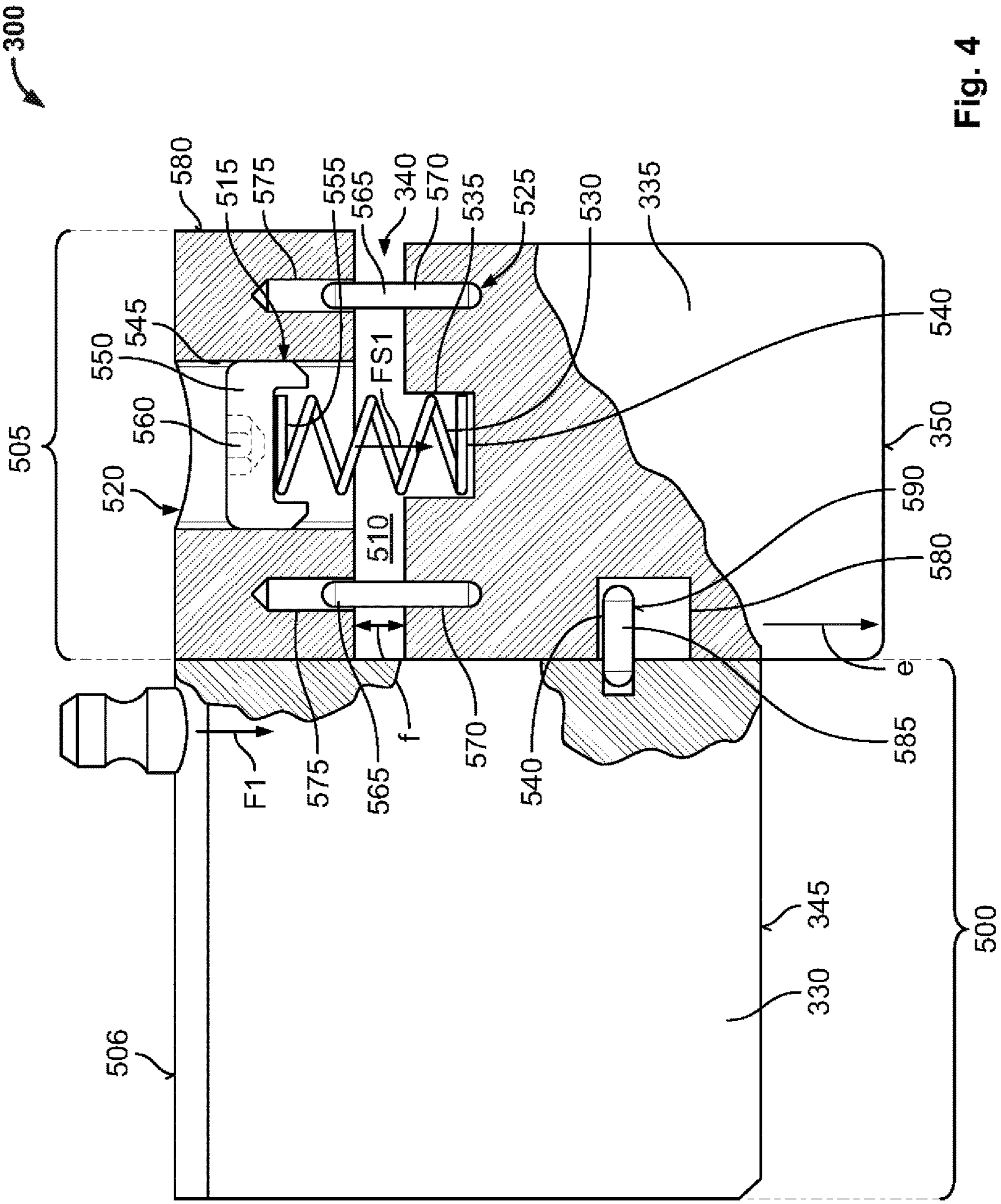
FIG. 4 is a side view of a first press jaw unit of the tool of FIG. 3.

FIG. 4 shows a side view of the first press jaw unit 305 of the tool 300 shown in FIG. 3. In FIG. 4, the first press jaw unit 305 is, in part, illustrated in cut-away form in order to provide a better illustration. In the embodiment, the first press jaw unit 305 and the second press jaw unit 315 are configured to be identical to one another, such that, below, the first press jaw 305 will be discussed as an example for both of the press jaws 305, 315. The explanations below likewise apply, with correspondingly adapted nomenclature, to the second press jaw unit 315.

The first press jaw 330 has a press portion 500 and a support portion 505, wherein the support portion 505 axially adjoins the press portion 500 in an axial direction. The support portion 505 is configured to be narrower in a radial direction than the press portion 500. Furthermore, a first outer side 506 of the first press jaw 330 is, by way of example, configured to be step-free.

The first press surface 345 is arranged radially at the inside on the press portion 500. Axially adjoining this, and radially to the inside of the support portion 505, there is arranged a press jaw receptacle 510. The press jaw receptacle 510 is delimited axially by the press portion 500 and radially to the outside by the support portion 505. The press jaw receptacle 510 is configured to be open in a radially inward direction. The second press jaw 335 is arranged, in certain portions, in the press jaw receptacle 510. Here, the second press jaw 335 projects with the second press surface

350 in a radial direction beyond the first press surface 345 and out of the press jaw receptacle 510.

The first setting device 340 has at least one spring unit 515, one adjusting unit 520 and one guide 525, as shown in FIG. 4. The spring unit 515 may have a spring element 530, wherein the spring element 530 is configured for example as a helical spring. Some other embodiment of the spring 530 is self-evidently also possible. The spring 530 is oriented so as to run in a radial direction. The spring 530 is supported radially at the inside on the second press jaw 335. For this purpose, a spring receptacle 535, which is configured for example as a blind bore, may be provided in the second press jaw 335. The spring 530 engages with a first spring end 540 into the spring receptacle 535.

The adjusting unit 520 is provided radially to the outside in relation to the second press jaw 335. The adjusting unit 520 has, by way of example, a first threaded bore 545 that is arranged from the inside to the outside in a radial direction in the support portion 505. A first screw 550, for example a grub screw, is screwed into the first threaded bore 545. A second, outer end 555 of the spring 530 is supported on the first screw 550 at the radially inner side of the first screw 550. The first screw 550 may have, radially on the outside, a tool profile 560 into which a further tool can be engaged for the purposes of rotating the first screw 550. By the first screw 550 and a corresponding screwing-in depth of the first screw 550 in the first threaded bore 545, a prestress force FS1 of the spring 530 can be adjusted by virtue of the screw 550 being screwed in or screwed out.

The guide 525 serves to guide the second press jaw 335 in a circumferential direction and in an axial direction in the movement between the first press position and the second press position. The guide 525 has, by way of example, at least one guide element 565, which is for example of pin-like and/or cylindrical configuration and engages into a guide element receptacle 570 of the second press jaw 335. The guide element 565 may for example be pressed into the guide element receptacle 570. The guide element 565 extends in an embodiment in a radial direction.

The guide element 565 engages with a radially outer portion into a guide receptacle 575, wherein the guide receptacle 575 is configured correspondingly to the guide element 565. Here, the guide receptacle 575 may be selected to form a clearance fit system with the guide element 565. By way of example, the guide receptacle 575 is formed as a blind bore, which leads from radially inside to radially outside, in the support portion 505. The guide receptacle 575 may for example be arranged in an axial direction between the first threaded bore 545 and a third end side 580 of the first press jaw 330, which is arranged on a side of the support portion 505 which faces away from the press portion 500. It is self-evidently also possible, as shown in FIG. 4, for further guide elements 565, guide element receptacles 570 and guide receptacles 575 to be provided. For example, axially between the press portion 500 and the first threaded bore 545, there may additionally also be provided a further guide element 565, which is situated in a further guide element receptacle 570 and engages into a further guide receptacle 575.

The adjustability of the second and fourth press surfaces 350, 375 ensures that reliable crimping of the crimp sleeve 60 on the sheath 35 is ensured. It can thus be ensured that the electrical line 20 is relieved of tension in a particularly effective manner.

As an alternative to the arrangement of the guide 525 shown in FIG. 4, it would also be possible for the guide element receptacle 570 to be arranged in the support portion 505 and for the guide receptacle 575 to be arranged in the second press jaw 335. The embodiment shown in FIG. 4 however has the advantage of being particularly easy to assemble, because, in this way, the guide element 565 can be pressed particularly easily into the guide element receptacle 570 that is arranged in the second press jaw 335. In this case, the guide element 565 extends from radially outside to radially inside and is mechanically connected to the support portion 505.

The guide 525 furthermore has a slotted-guide receptacle 580, wherein the slotted-guide receptacle 580 is arranged at an end side on that side of the second press jaw 335 which faces towards the press portion 500. The slotted-guide receptacle 580 may be configured in the form of an elongated hole. The guide 525 furthermore has a stop element 585. The stop element 585 may be configured in the form of a pin and/or in the form of a cylinder, wherein the stop element 585 extends, in its main direction of extent, parallel to the straight line 320. The stop element 585 has a stop surface 590 on the circumference. The stop element 585 is, by way of example, pressed into the press portion 500. In an embodiment, in the first press position, the stop surface 590 lies against an end of the slotted-guide receptacle 580 and prevents an undesired relaxation of the prestressed spring 530. Furthermore, a movement of the second press jaw 335 beyond the second press position is limited by the abutment of the stop element 585 against the slotted-guide receptacle 580. An undesired disengagement or detachment of the second press jaw 335 from the first press jaw 330 is thus prevented.

A projecting length e of the second press surface 350 in a radial direction relative to the first press surface 345 is greater than a maximum movement travel f of the second press jaw 335 between the first press position and the second press position. In the first press position, the movement of the second press jaw 335 is blocked by abutment of the second press jaw 335 radially at the outside against the support portion 505. It would likewise be possible for the movement of the second press jaw 335 radially outward beyond the first press position to be blocked by further abutment of the slotted-guide receptacle 580 against the stop element 585.

Owing to the fact that the second press jaw unit 315 is configured to be identical to the first press jaw unit 305, the fourth press surface 375 can be adjusted between the third press position and the fourth press position by the second setting device 365. The guide 525 of the second press jaw unit 315 serves to guide the fourth press jaw 360 in a circumferential direction and in an axial direction in the movement between the third press position and the fourth press position. The spring 530 prestresses the fourth press jaw 360.

Figure 5:
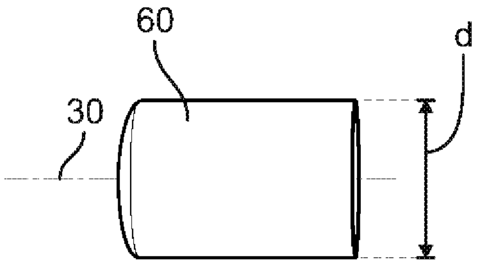
FIG. 5 is a perspective view of a crimp sleeve of the arrangement of FIG. 1.

FIG. 5 is a perspective illustration of a crimp sleeve 60 of the arrangement 10 shown in FIGS. 1 to 3 in an uncrimped state. In the uncrimped state, the crimp sleeve 60 is configured substantially as a hollow cylinder. Here, the crimp sleeve 60 has a substantially constant material thickness in a radial direction with respect to the axis 30. The crimp sleeve 60 may be formed for example from a thin-walled material, for example sheet metal.

Figure 6:
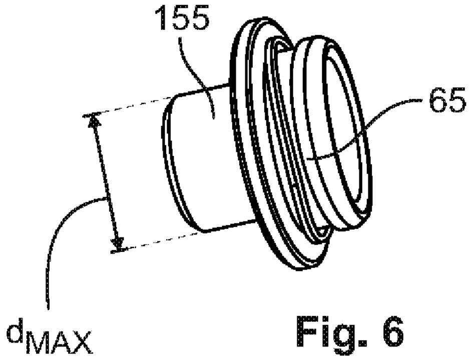
FIG. 6 is a perspective view of a contact element of the arrangement of FIG. 1.

FIG. 6 is a perspective illustration of the contact element 65 of the arrangement 10 shown in FIGS. 1 to 3 in an uncrimped state. In the embodiment, by way of example, an inner diameter d of the crimp sleeve 60 has been selected to be greater than a maximum outer diameter dMAX of the connecting portion 155 of the contact element 65. The connecting portion 155 is mechanically more rigid than the crimp sleeve 60. This is achieved for example by virtue of a further wall thickness of the connecting portion 155 being considerably thicker (for example by a factor of 1.5 to 10) than the wall thickness of the crimp sleeve 60.

Figure 7:
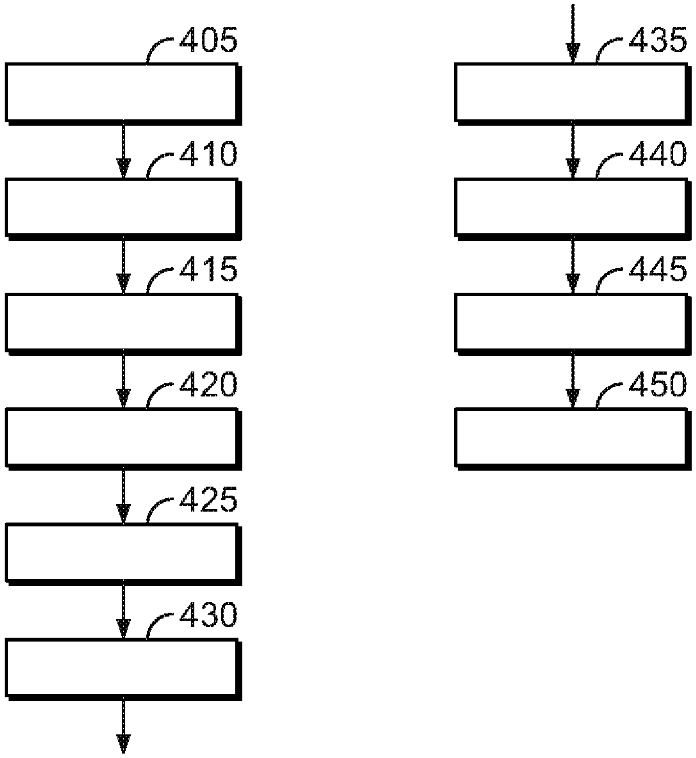
FIG. 7 is a flowchart of a method for producing the arrangement of FIG. 1.
Figure 8:
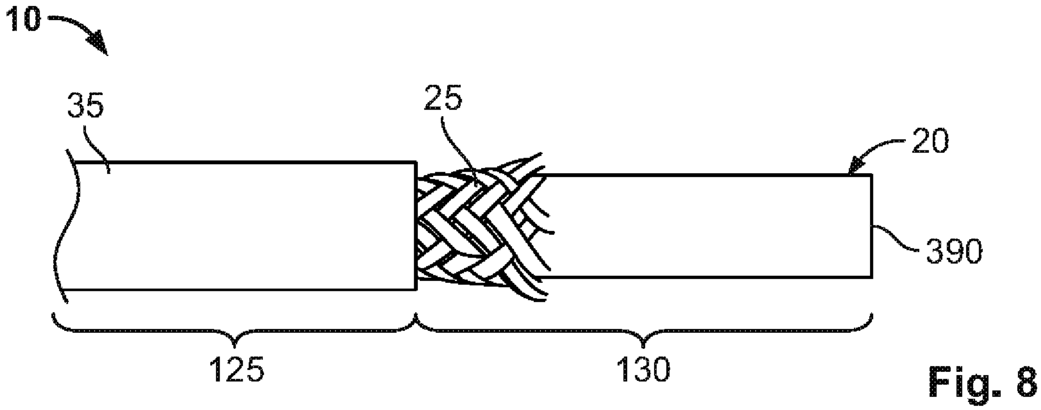
FIG. 8 is a side view of an electrical line after a second method step.
Figure 9:
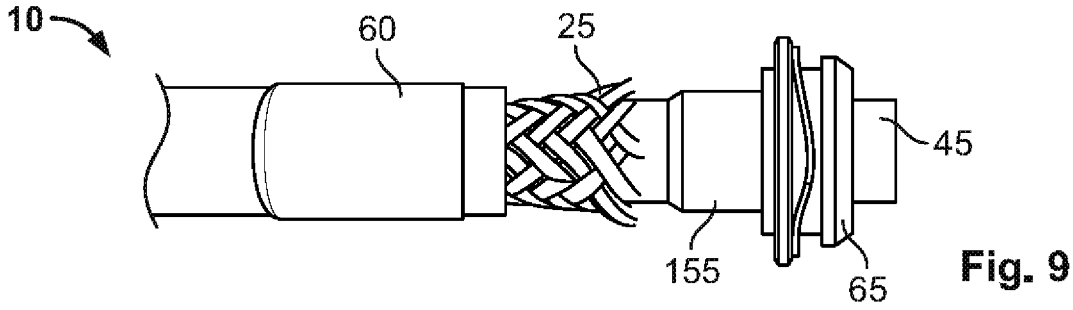
FIG. 9 is a side view of the arrangement after a fifth method step.
Figure 10:
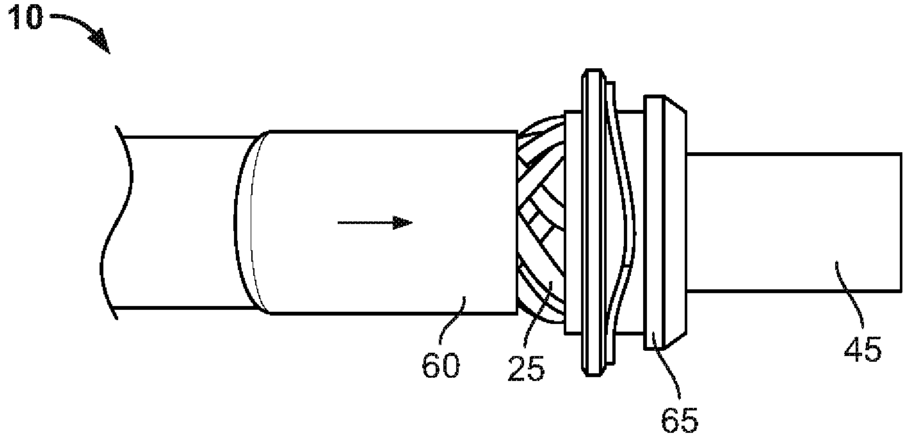
FIG. 10 is a side view of the arrangement after a sixth method step.

FIG. 7 shows a flow diagram of a method for producing the arrangement 10 shown in FIGS. 1 to 3. FIG. 8 is a perspective illustration of the electrical line 15 after a second method step 410. FIG. 9 is a perspective illustration of the arrangement 10 after a fifth method step 425. FIG. 10 is a perspective illustration of the arrangement 10 after a sixth method step 430.

In a first method step 405, furthermore before the further method steps are carried out, the first press jaw unit 305 and the second press jaw unit 315 are calibrated. For this purpose, an opening width of the tool receptacle 325 between the first press surface 345 and the third press surface 370 is ascertained in the second position of the first and second press jaw units 305, 315, and, on the basis of a setpoint value for the opening width, the first press jaw unit 305 and the second press jaw unit 315 are positioned and set in the second position.

Furthermore, using the first screw 550, a one-off setting of the prestress force FS1 of the spring 530 is performed on the basis of a desired crimping force, and the first screw 550 is optionally secured against undesired rotation using a screw securing element, for example a screw securing paint.

The press jaw units 305, 315 are thereafter moved radially outwards into the first position by the guide unit 310. Having arrived in a radially outer first position, the press jaw units 305, 315 are held by the guide unit 310, such that the tool receptacle 325 is open particularly widely in a radial direction. Furthermore, the respectively prestressed spring 530 causes the second press jaw 335 to be situated in the first press position and the fourth press jaw 360 to be situated in the third press position.

Firstly, in the second method step 410 (cf. FIG. 8) that follows the first method step 405, the electrical line 20, arriving for example from a roll, is severed, and, directly subsequently, at a severing point 390, the sheath 35 is removed from the electrical conductor 25 in order to form the stripped portion 130 between the severing point 390 and the sheathed portion 125.

In a third method step 415, the crimp sleeve 60 (cf. FIG. 5) and the contact element 65 (cf. FIG. 6) are provided in an uncrimped state.

In the fourth method step 420, the crimp sleeve 60 is pushed onto the line 20 to such an extent that the crimp sleeve 60 fully encompasses the sheathed portion 125.

In a fifth method step 425 (cf. FIG. 9) that follows the fourth method step 420, the first electrical conductor 25 is for example expanded. This may be performed for example using a (hollow) mandrel.

Furthermore, the intermediate layer 45 and the second electrical conductor 50 are inserted through the opening 170 of the contact element 65 such that the second electrical conductor 50 and the intermediate layer 45 project beyond the contact element 65 on a side of the contact element 65 that faces away from the connecting portion 155.

Here, the contact element 65 is positioned relative to the first electrical conductor 25 such that the connecting portion 155 is arranged radially between the intermediate layer 45 and the first electrical conductor 25. The first electrical conductor 25 radially circumferentially encompasses the connecting portion 155 and lies against the third outer circumferential side 135 of the connecting portion 155.

In a sixth method step 430 (cf. FIG. 10) that follows the fifth method step 425, the crimp sleeve 60 is pushed onto the connecting portion 155 and the first electrical conductor 25 on the connecting portion 155. Here, the crimp sleeve 60 forms the annular gap 180 with the third outer circumferential side 135. The expanded first electrical conductor 25 is arranged in the annular gap 180.

After the sixth method step 430, the arrangement 10 is placed into the tool receptacle 325 in a seventh method step 435 (cf. FIG. 3). Here, the arrangement 10 is positioned such that the press surfaces 345, 350, 370, 375 are positioned so as to radially overlap the crimp sleeve 60. Here, a radial overlap is to be understood to mean that, in a projection in a radial direction into a plane in which the axis 30 and the straight line 320 extend, the two components, for example the press surfaces 345, 350, 370, 375 and the crimp sleeve 60, overlap. Likewise, the first press surface 345 and the third press surface 370 radially overlap the connecting portion 155 and the expanded first electrical conductor 25 in the stripped portion 130.

In the embodiment, the crimp sleeve 60 and the first and/or second press jaw unit 305, 315 have substantially the same axial extent along the axis 30 or the straight line 320. Here, the arrangement 10 is positioned in the tool receptacle 325 such that the crimp sleeve 60, in an embodiment, fully radially overlaps the first and second press jaw units 305, 315.

In an eighth method step 440 that follows the seventh method step 435, the guide unit 310 moves the first press jaw unit 305 and the second press jaw unit 315 from the radially outer first position radially inwards into a second position (cf. FIG. 3). Each of the press jaws 330, 335, 355, 360 lies with the respectively associated press surface 345, 350, 370, 375 against the outer circumferential side 115, 120 of the crimp sleeve 60.

As the press jaw units 305, 315 are moved inward from the first, radially outer position into the radially inner second position, it is firstly the case that the second and fourth press surfaces 350, 375 come into contact with the second outer circumferential side 120 of the second sub-portion 75 of the crimp sleeve 60.

The guide unit 310 provides a first pressing force F1 at the first press jaw unit 305 and a second pressing force F2 at the second press jaw unit 315, shown in FIG. 3. The first pressing force F1 and the second pressing force F2 are each directed from radially outside to inside and are of substantially identical magnitude.

During the crimping and the movement from the radially outer first position into the radially inner second position, and for as long as the first press jaw 330 and the third press jaw 355 are, at the first press surface 345 and the third press surface 370, spaced apart from the first outer circumferential side of the crimp sleeve 60, the first pressing force F1 is transmitted exclusively from the first press jaw 330 via the first setting device 340 to the second press jaw 335 and from the second press jaw 335 to the second press surface 350. Likewise, for as long as the third press surface 370 is still arranged spaced apart from the first outer circumferential side, the second pressing force F2, which is introduced into the second press jaw unit 315 by the guide unit 310, is transmitted from the third press jaw 355 via the second setting device 365 to the fourth press jaw 260.

The crimp sleeve 60 provides a respective opposing force FG1, FG2 that is directed oppositely to the first pressing force F1 and to the second pressing force F2. With increasing pressing force F1, F2, the spring 530 of the press jaw unit 305, 315 can compress in each case, and reliable abutment of the second and fourth press surfaces 350, 375 against the second sub-portion 115 of the crimp sleeve 60 is ensured.

Here, the second press jaw 335 is moved radially outwards from the first press position into the second press position, and the fourth press jaw 360 is moved from the third press position into the fourth press position.

Owing to the soft form of the crimp sleeve 60, the first pressing force F1 is introduced exclusively from the first press jaw unit 305, via the second press surface 350, into the second outer circumferential side 120 of the crimp sleeve 60.

By the first pressing force F1, which within the first press jaw unit 305 is transmitted from the first press jaw 330 via the first setting device 340 to the second press jaw 335, the second press jaw 335 forms the second stamped indentation 190 into the circumference of the crimp sleeve 60 in the second sub-portion 75. Offset with respect to the second stamped indentation 190 in a circumferential direction, the fourth stamped indentation 195 is stamped into the second sub-portion 75 in a circumferential direction by the fourth press surface 375 by the second pressing force F2. Here, the second thickened portion 200 forms between the second stamped indentation 190 and the fourth stamped indentation 195.

The first and second pressing forces F1, F2 continue to be provided, and the guide unit 310 guides the first press jaw unit 305 and the second press jaw unit 315 radially further out of the first position in the direction of the second position. In the process, the pressing force F1, F2 increases in magnitude. The spring 530 is also compressed. Shortly before the second position is reached, the first press surface 345 of the first press jaw 330 also comes into contact with the first outer circumferential side 115 of the contact element 65. Likewise, the third press surface 370 comes into contact with the first outer circumferential side 115 of the crimp sleeve 60 in the first sub-portion 70.

The first press jaw 330 transmits a first proportion of the first pressing force F1 directly to the first pressing surface 345, and the first pressing surface 345 stamps the first stamped indentation 140 into the first sub-portion 70. Here, owing to the first proportion of the first pressing force F1, the first inner circumferential side 115 in the first sub-portion 70 comes to lie closely against the third outer circumferential side 135 of the first electrical conductor 25. Furthermore, a second proportion of the first pressing force F1 is transmitted via the first setting device 340 to the second pressing jaw 335, which furthermore stamps the second stamped indentation 145 into the second outer circumferential side 120 of the crimp sleeve 60. Here, the second press jaw 335 may be pushed radially outwards into the second press position.

During the pressing and crimping of the crimp sleeve 60, the second inner circumferential side 105 comes to lie closely against the fifth outer circumferential side 210 of the sheath 35 and generates the second frictional engagement. Here, the second press jaw 335 may abut against the support portion 505, or the second proportion of the first pressing force F1 may be transmitted substantially exclusively via the spring 530.

In the embodiment, through the adjustment of the prestress force FS1 of the spring 530, shown in FIG. 4, it is possible even without abutment of the second press jaw 335 for the second proportion of the first pressing force F1 to be transmitted via the support portion 505 and the spring 530 to the second press jaw 335, which, by being mounted so as to be flexibly movable in a radial direction, can lie particularly effectively against the crimp sleeve 60 in the second sub-portion 75. For this purpose, the spring 530 must be selected in a manner dependent on the pressing force F1, F2 and is correspondingly prestressed with the prestress force FS1.

In an alternative embodiment, the second press jaw 335 abuts radially at the outside against the support portion 505, such that a particularly high second proportion of the first pressing force F1 can be transmitted from the first press jaw 330 via the support portion 505 to the second press jaw 335.

The introduction of force for the stamping of the third and fourth stamped indentations 145, 195 by the second press jaw unit 315 also takes place analogously. Here, a first proportion of the second pressing force F2 is transmitted directly from the third press jaw 355 to the third press surface 370 when the third press surface 370 comes into contact with the first sub-portion 70 of the crimp sleeve 60 as the second press jaw unit 315 is moved into the second position. Here, with the first proportion of the second pressing force F2, the third press surface 370 forms the third stamped indentation 145 into the crimp sleeve, such that, at the third stamped indentation 145, the first inner circumferential side 95 of the crimp sleeve 60 comes to lie closely against the first electrical conductor 25 and generates the first frictionally engaging connection between the first inner circumferential side 95 and the electrical conductor 25, on the one hand, but also between the first electrical conductor 25 and the connecting portion 155. Furthermore, the third press jaw 355 transmits a second proportion of the second pressing force F2 to the second setting device 365. The second setting device 365 transmits the second proportion of the second pressing force F2 to the fourth press jaw 360, which furthermore stamps the fourth stamped indentation 195 into the second outer circumferential side 120 of the crimp sleeve 60.

During the stamping of the stamped indentations 140, 190, 145, 195, a proportion of the material of the crimp sleeve 60 flows into a respective gap between the first press jaw unit 305 and the second press jaw unit 315, and respectively forms the first and second thickened portions 150, 200. The crimp sleeve 60 thus has different material thicknesses in a circumferential direction, such that the material thicknesses radially to the inside of the first to fourth stamped indentations 140, 190, 145, 195 are smaller than those at the first and second thickened portions 150, 200.

In a ninth method step 445 that follows the eighth method step 440, the press jaw unit 305, 315 is, after the completion of the crimping in the eighth method step 440, moved by the guide unit 310 radially outwards from the second position into the first position again, such that the tool receptacle 325 is open again and the crimped contact device 15 together with the electrical line 20 can be removed from the tool receptacle 325.

The stamping of the stamped indentations 140, 190, 145, 195 and the formation of the thickened portions 150, 200 has the advantage that the crimp sleeve 60 is thus stiffened, and thus an undesired expansion of the crimp sleeve 60 once the press jaw units 305, 315 are removed is avoided. A particularly good first crimp connection between the first electrical conductor 25 and crimp sleeve 60, and a particularly good second crimp connection between the sheath 35 and the same crimp sleeve 60, are thus provided.

Furthermore, at the same time, a relief of tension is generated owing to the connection of the crimp sleeve 60 to the sheath 35, and also owing to the crimping of the crimp sleeve 60 with the first electrical conductor 25 and with the connecting portion 155 in a single crimping/pressing step in the tool 300. The crimp sleeve 60 can be connected both to the contact element 65 and to a sheath 35 in one crimping step. In this way, a particularly high cycle rate can be achieved using the tool 300.

As a result of the stamping of the stamped indentations 140, 190, 145, 195 and the associated reduction of the inner diameter of the crimp sleeve 60 at the connecting portion 155 and at the sheath 35, it is the case even after the tool 300 has been removed that the crimp sleeve 60 at least partially maintains the first and second pressing forces F1, F2 and presses the first electrical conductor 25 radially at the inside against the connecting portion 155, such that the first frictionally engaging connection between the first electrical conductor 25 and the connecting portion 155 and the first inner circumferential side 95 of the first sub-portion 70 of the crimp sleeve 60, and the second frictionally engaging connection between the second inner circumferential side 105 of the second sub-portion 75 of the crimp sleeve 60 and the fifth outer circumferential side 210 of the sheath 35, are maintained.

As a result of the fact that the first inner circumferential side 95 comes to lie closely against the first electrical conductor 25 and the second inner circumferential side 105 comes to lie closely against the fifth outer circumferential side 210 of the sheath 35, a situation in which portions of the crimp sleeve 60 gouge into the first electrical conductor 25 and into the sheath 35 during the stamping and crimping of the stamped indentations 140, 190, 145, 195 is avoided. On the contrary, after the stamping of the stamped indentations 140, 190, 145, 195, the crimp sleeve 60 has a substantially cylindrical form at each of the first inner circumferential side 95 and the second inner circumferential side 105, but with respectively different reduced inner diameters. This embodiment has the advantage that damage to the first electrical conductor 25 and to the sheath 35 as a result of the stamping of the crimp sleeve 60 is avoided.

Figure 11:
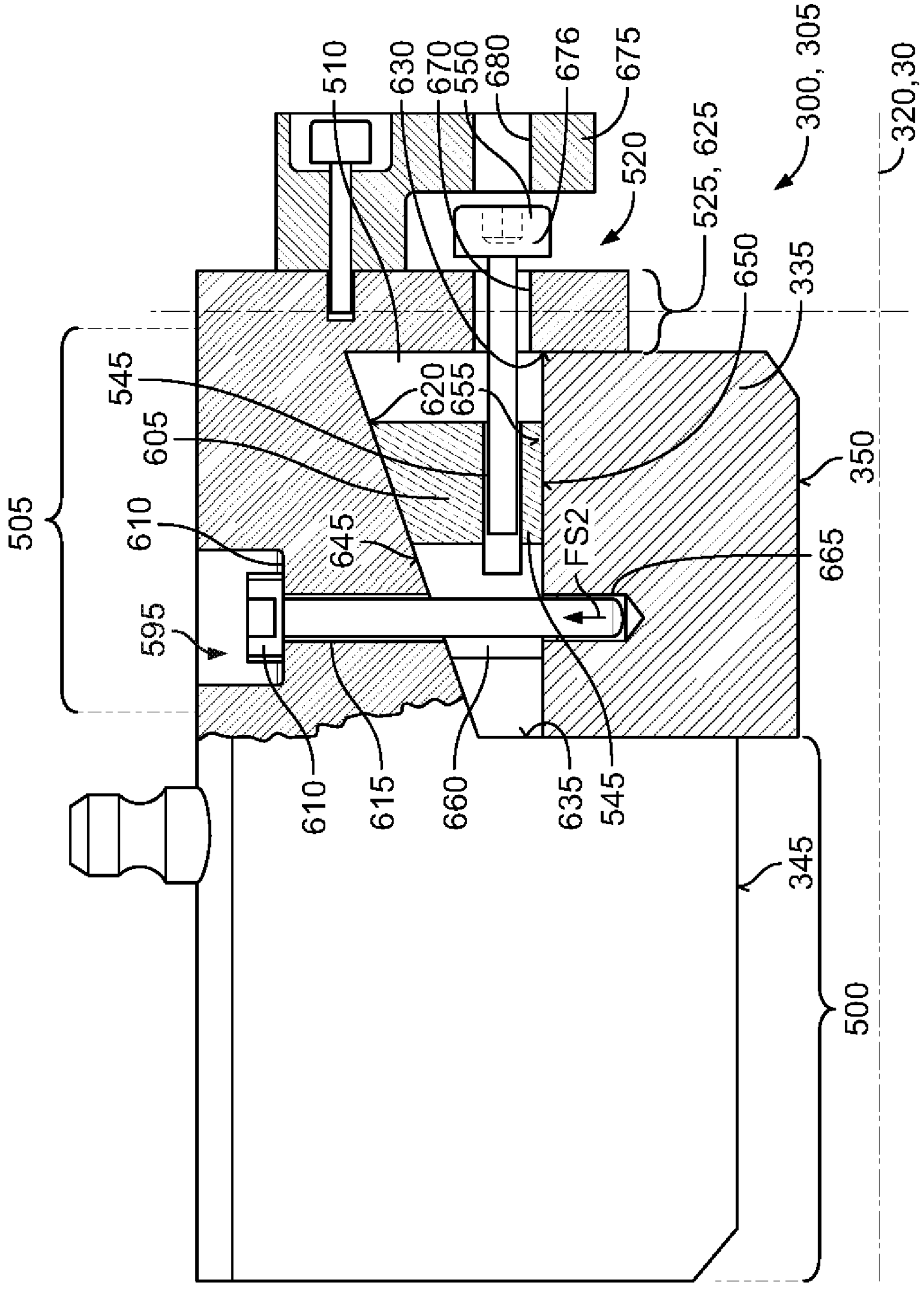
FIG. 11 is a partially sectional side view of another embodiment of the tool.

FIG. 11 shows a detail of a side view of the tool 300 shown in FIG. 3 according to a second embodiment. The tool 300 is substantially identical to the tool 300 according to the first embodiment as shown in FIGS. 3 and 4. Only the differences of the tool 300 according to the second embodiment as shown in FIG. 11 in relation to the tool 300 according to the first embodiment as shown in FIGS. 3 and 4 will be discussed below.

It is pointed out that, once again, only the first press jaw unit 305 will be discussed below. By way of example, the second press jaw unit 315 is configured to be identical to the first press jaw unit 305, such that the explanations given below with regard to the first press jaw unit 305 likewise apply to the second press jaw unit 315, with the exception that the second pressing force F2 rather than the first pressing force F1 is introduced into the second press jaw unit 315.

In FIG. 11, the spring unit 515 is omitted. Instead of the spring unit 515, the first press jaw unit 305 has a fastening device 595 and a wedge element 605. The fastening device 595 may, for example, have a second screw 610.

The second screw 610 is inserted into a screw opening 615, wherein the screw opening 615 is arranged in the support portion 505 so as to run in a radial direction. On the support portion 505, the first press jaw 330 has a first ramp surface 620, wherein the first ramp surface 620 is arranged so as to be obliquely inclined with respect to the straight line 320. Here, the first ramp surface 620 may be arranged such that a radial spacing between the straight line 320 and the first ramp surface 620 increases with increasing axial spacing between the first ramp surface 620 and the press portion 500. The first ramp surface 620 may furthermore be of planar form and extend in a plane. The first ramp surface 620 may also be configured in the form of a partial cone with respect to the straight line 320.

In the embodiment of FIG. 11, the guide element receptacle 570, the guide element 565, and the guide receptacle 575 are omitted. Alternatively, the guide 525 has a guide portion 625 that extends inwards in a radial direction, wherein the guide portion 625 is oriented so as to run in a sixth plane perpendicularly with respect to the straight line 320. Here, the guide portion 625 is connected, radially at the outside, to the support portion 505. In particular, the press portion 500, the support portion 505 and the guide portion 625 may be in single-piece and materially integral form. The first press jaw 330 is particularly mechanically rigid if the press portion 500 and the support portion 505 are in single-piece and materially integral form.

On a first axial side facing towards the press portion 500, the guide portion 625 has a first guide surface 630, which is planar. On an axial side facing towards the guide portion 625, the press portion 500 has a second guide surface 635 which, by way of example, is arranged parallel to the first guide surface 630. The first and second guide surfaces 630, 635 are, by way of example, oriented so as to run perpendicularly with respect to the straight line 320. The first guide surface 630 and the second guide surface 635, together with the first ramp surface 620, delimit the press jaw receptacle 510, wherein both the second press jaw 335 and the wedge element 605 are arranged in the press jaw receptacle 510. Here, the wedge element 605 is arranged in a radial direction between the second press jaw 335 and the first ramp surface 620.

Radially at the outside, the wedge element 605 has a second ramp surface 645, wherein the second ramp surface 645 is oriented parallel to the first ramp surface 620. In the assembled state, the second ramp surface 645 lies against the first ramp surface 620 radially at the inside. In an axial direction, the wedge element 605 is arranged between the first guide surface 630 and the second guide surface 635, wherein an axial extent of the wedge element 605 is smaller than a maximum axial width of the press jaw receptacle 510 between the first guide surface 630 and the second guide surface 635.

Radially at the inside and opposite the second ramp surface 645 in a radial direction, the wedge element 605 has a first contact surface 650. The first contact surface 650 is configured to run parallel to the straight line 320. Opposite the first contact surface 650 in a radial direction, the second press jaw 335 has a second contact surface 655, wherein the second contact surface 655 is configured correspondingly to the first contact surface 650. The first contact surface 650 and the second contact surface 655 may be configured to run in a circumferential direction on a circular path about the straight line 320.

The wedge element 605 has a first passage opening 660 in a radial direction, wherein the first passage opening 660 is, by way of example, configured to be open on a side facing towards the second guide surface 635. The first passage opening 660 extends radially inwards in a radial direction from the second ramp surface 645 to the first contact surface 650. The first passage opening 660 may be configured in the form of a groove.

The adjusting unit 520 in the embodiment of FIG. 11 is configured differently to that shown in FIG. 4. By contrast to the latter, the first threaded bore 545 of the adjusting unit 520 is arranged in the wedge element 605 and runs, in an embodiment, parallel to the straight line 320. Here, the first threaded bore 545 is arranged on a side of the wedge element 605 which faces towards the first guide surface 630, and thus on a side of the wedge element 605 which faces away from the press portion 500. The first threaded bore 545 may be configured as a blind bore. The first threaded bore 545 may also open into the first passage opening 660. Alternatively, the first passage bore 660 and the first threaded bore 545 may be arranged offset with respect to one another in a circumferential direction.

Furthermore, in addition to the first screw 550, which in the embodiment is configured for example as a hexagonal-socket screw with a shank, the adjusting unit 520 has a second passage opening 670, wherein the second passage opening 670 is arranged in the guide portion 625 and extends through the guide portion 625 substantially in an axial direction parallel to the straight line 320. The first screw 550 is inserted through the second passage opening 670 and is screwed into the first threaded bore 545. An axial position of the wedge element 605 relative to the press portion 500 is set in accordance with the extent to which the first screw 550 is screwed into the first threaded bore 545.

Additionally, on a side facing away from the press portion 500, a holder 675 may be arranged on the support portion 505, wherein the holder 675 is fastened in reversible, non-destructively detachable fashion to the support portion 505 at the guide portion 625, for example by screw connection. The holder 675 projects in a radial direction beyond a screw head 676 of the first screw 550 and prevents the screw head 676 from being able to be pulled away from the guide portion 625 in an axial direction or pushed away by an axial deflection of the wedge element 605.

Additionally, a third passage opening 680 may be arranged in the holder 675 for the insertion of an assembly tool into the screw head 676 for the purposes of rotating the first screw 550 by the screw head 676. The third passage opening 680 is thus arranged so as to overlap the first screw 550 in an axial direction. In this way, the wedge element 605 can be displaced in an axial direction by the screw 550.

The axial movement clearance of the screw head 676 of the first screw 550, for example in an axial direction between the holder 675 and the guide portion 625, is selected such that, on the one hand, jamming of the screw head 676 of the first screws 550 is prevented, but at the same time an axial movement clearance of the first screw 550 between the holder 675 and the guide portion 625 is minimized.

The second press jaw 335 has a second threaded bore 665, wherein the second threaded bore 665 extends from radially outside in the direction of the second press surface 350 but ends at a distance from the second press surface 350. The second screw 610 is inserted through the screw opening 615 and is screwed into the second threaded bore 665. Here, the screw 610 engages through the first passage opening 660.

The positioning of the second press surface 350 and of the fourth press surface 375 will be discussed below.

The screw 610 provides a clamping force FS2 which acts in a radial direction and which presses the second press jaw 335 with the second contact surface 655 against the first contact surface 650 of the clamping element 605. Furthermore, the clamping force FS2 presses the second ramp surface 645 against the first ramp surface 620.

In order to move the second press surface 350 in a radial direction between the first press position and the second press position, and the fourth press surface 375 between the third press position and the fourth press position, the wedge element 605 can be displaced axially between the first guide surface 630 and the second guide surface 635 by the first screw 550. For this purpose, the second screw 610 is loosened.

After an axial position of the wedge element 605 between the first guide surface 630 and the second guide surface 635 has been set by the first screws 550, the second screw 610 is tightened, such that the first ramp surface 620 and the second ramp surface 645 and the first and second contact surfaces 650, 655 lie against one another. Here, by way of axial abutment of the second press jaw 335 and of the fourth press jaw 360 against the guide surfaces 630, 635, the first guide surface 630 and the second guide surface 635 guide the second press jaw 335 between the first press position and the second press position and guide the fourth press jaw 360 between the third press position and the fourth press position.

When the second screw 610 is tightened and the clamping force FS2 is provided, the holder 675 ensures that the obliquely running ramp surfaces 645, 620 and the clamping force FS2 do not cause the wedge element 605 to be pushed in the direction of the holder 675, with an axial position of the wedge element 605 between the first guide surface 630 and the second guide surface 635 rather being defined by abutment of the screw head 676 of the first screw 550 against the holder 675.

The embodiment shown in FIG. 11 has the advantage that the radial position of the second press surface 350 relative to the first press surface 345 can be adjusted in a defined manner by the setting device 340, 365. In the case of the further press jaw unit(s) 305 and the second press jaw unit 315, too, the second press jaw 335 and the fourth press jaw 360 can each be adjusted relative to the first press surface 345 and relative to the third press surface 370 respectively by means of the setting device 340, 365 shown in FIG. 11. It is thus ensured that reliable crimping of the sheath 35 by the second sub-portion 75 of the crimp sleeve 60 is ensured during the production of the arrangement 10.

The production method for producing the arrangement 10 using the tool 300 shown in FIG. 11 is substantially identical to the method described in FIG. 7. By contrast thereto, no adjustment of the second and fourth press jaws 335, 360 takes place during the seventh method step 435, but rather the respective press position of the second and fourth press jaws 335, 360 and thus the press position of the second press surface 350 and of the fourth press surface 375 are calibrated in advance in the first method step 405 together with the adjustment of the first press jaw 330 and of the third press jaw 355.

What is claimed is:

1. A tool for producing an arrangement composed of an electrical line and a contact device with a crimp sleeve, comprising:

- a first press jaw unit delimiting, at an inside, a tool receptacle that extends along a straight line and receives the crimp sleeve and the electrical line, the first press jaw unit has a first press jaw with a first press surface arranged on a side facing towards the tool receptacle, a second press jaw with a second press surface arranged on a side facing towards the tool receptacle, and a first setting device mechanically connecting the first press jaw to the second press jaw, the first press surface is offset with respect to the second press surface in an axial direction with respect to the straight line, the second press surface is adjustable by the first setting device between a first press position positioned radially inwardly and a second press position radially to an outside in relation to the first press position; and
- a guide unit providing a first pressing force with a first proportion transmitted via the first press jaw into the first press surface, the first setting device transmits a second proportion of the first pressing force from the first press jaw to the second press jaw, the first press surface stamps a first stamped indentation and the second press surface stamps a second stamped indentation into the crimp sleeve to crimp the crimp sleeve on the electrical line.

2. The tool of claim 1, further comprising a second press jaw unit arranged offset with respect to the first press jaw unit in a circumferential direction with respect to the straight line, the second press jaw unit has a third press jaw with a third press surface facing towards the tool receptacle, a fourth press jaw with a fourth press surface facing towards the tool receptacle, and a second setting device.

3. The tool of claim 2, wherein the third press surface is arranged offset in the axial direction with respect to the fourth press surface, the second setting device mechanically connects the third press jaw to the fourth press jaw, the fourth press surface is adjustable by the second setting device between a third press position positioned radially inwardly and a fourth press position radially to the outside in relation to the third press position, the third press surface stamps a third stamped indentation and the fourth press surface stamps a fourth stamped indentation into the crimp sleeve to crimp the crimp sleeve on the electrical line.

4. The tool of claim 3, wherein the first press surface and the third press surface are arranged in a common plane with respect to the straight line and extend in the circumferential direction to run on a common first circular path about the straight line.

5. The tool of claim 4, wherein the third press surface and the fourth press surface are arranged in a common further plane offset with respect to the common plane in an axial direction with respect to the second straight line, the third press surface and the fourth press surface extend in a circumferential direction to run on a common second circular path about the straight line.

6. The tool of claim 1, wherein the first press jaw has a press portion and a support portion, the support portion adjoins the press portion and is connected to the press portion in the axial direction, the first press surface is arranged radially at an inside on the press portion, the second press jaw is arranged radially at an inside with respect to the support portion, the first setting device is arranged radially between the support portion and the second press jaw and transmits the second proportion from the support portion to the second press jaw.

7. The tool of claim 6, wherein the press portion and the support portion are in a single piece and materially integral form.

8. The tool of claim 6, wherein the first setting device has a spring unit and a guide, the guide guides the second press jaw in a movement between the first press position and the second press position, the spring unit is arranged between the first press jaw and the second press jaw and pushes the second press jaw in a radial direction from the second press position radially inwards into the first press position.

9. The tool of claim 8, wherein the guide has a guide element and a guide receptacle corresponding to the guide element, the guide element is arranged radially at an inside on the support portion and is mechanically connected to the support portion, the guide element extends inwards in a radial direction from the support portion.

10. The tool of claim 9, wherein the guide receptacle is arranged in the second press jaw or the guide element is arranged radially at an outside on the second press jaw and is mechanically connected to the second press jaw.

11. The tool of claim 10, wherein the guide element extends outwards in the radial direction from the second press jaw, the guide receptacle is arranged in the support portion, and the guide element engages into the guide receptacle.

12. The tool of claim 8, wherein the guide has a slotted-guide receptacle arranged in the second press jaw and a stop element connected to the first press jaw, the stop element has a stop surface and, in the first press position, the stop surface lies against an end of the slotted-guide receptacle and limits a movement of the second press jaw relative to the first press jaw.

13. The tool of claim 12, wherein the stop element is a pin and is oriented parallel to the straight line.

14. The tool of claim 8, wherein the spring unit is prestressed in the first press position.

15. The tool of claim 8, wherein the first setting device has an adjusting unit coupled to the support portion, the adjusting unit has a first threaded bore arranged in the support portion and extending in a radial direction and a first screw screwed into the first threaded bore.

16. The tool of claim 15, wherein a prestress force of the spring unit in the first press position is defined dependent on a depth to which the first screw is screwed into the first threaded bore.

17. The tool of claim 15, wherein the first press jaw has, on a side facing the second press jaw, a first ramp surface obliquely inclined with respect to the straight line, the first setting device has a fastening device, an adjusting unit, and a wedge element, the wedge element is arranged radially between the support portion and the second press jaw, the second press jaw lies against the wedge element.

18. The tool of claim 17, wherein the wedge element has a second ramp surface on a side of the wedge element that faces the first ramp surface, the second ramp surface is obliquely inclined with respect to the straight line, the fastening device holds the second press jaw against the support portion and presses the wedge element between the support portion and the second press jaw, an axial spacing between the wedge element and the press portion is adjustable by the adjusting unit.

19. A method for producing an arrangement, comprising:

providing the tool of claim 1; providing a contact device and an electrical line having a first electrical conductor and a sheath encasing the first electrical conductor;

removing the sheath from the first electrical conductor in a stripped portion, the sheath remains on the first electrical conductor in a sheathed portion adjoining the stripped portion;

pushing a crimp sleeve over the stripped portion and the sheathed portion;

positioning the crimp sleeve and the electrical line in the tool receptacle;

moving the first press jaw unit from a first position radially inwardly to a second position;

introducing the first pressing force into the first press jaw unit;

stamping, with the first proportion of the first pressing force, the first stamped indentation into the crimp sleeve with the first press jaw at the first press surface, a first inner circumferential side of the crimp sleeve is pressed against the first electrical conductor; and stamping, with the second proportion of the first pressing force, the second stamped indentation into the crimp sleeve with the second press jaw at the second press surface, the second stamped indentation is arranged offset with respect to the first stamped indentation in the axial direction, a second inner circumferential side of the crimp sleeve is pressed against the sheath.

* * * * *